Figure 1:
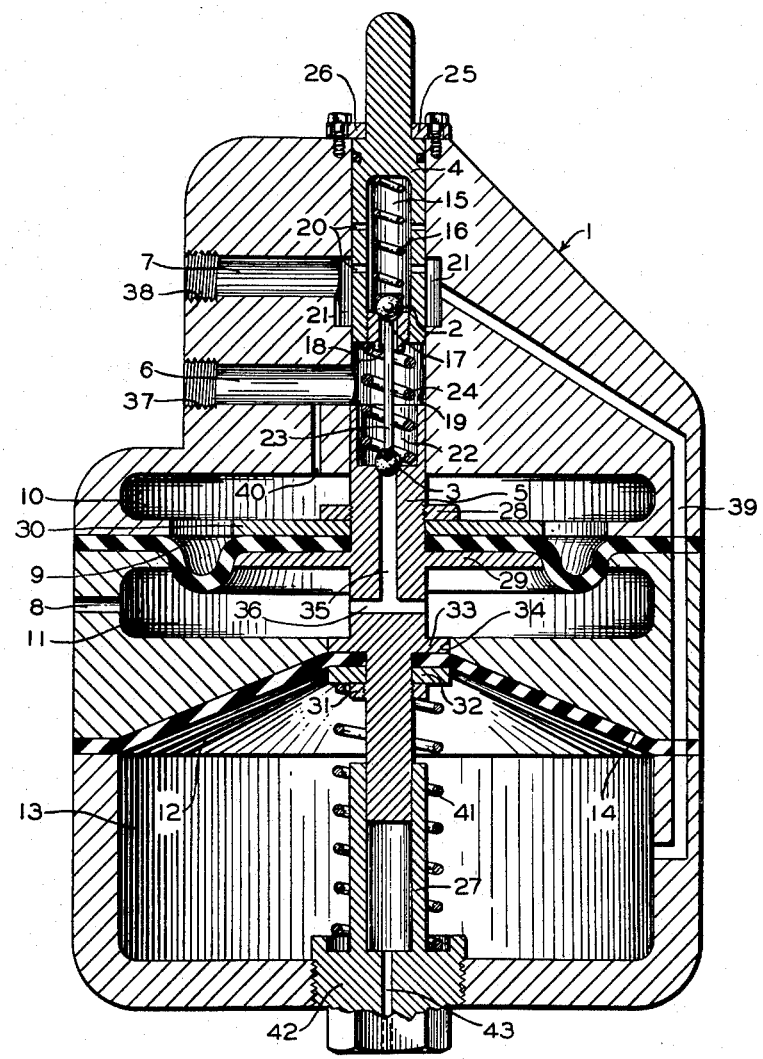

Nov. 1, 1960 E. L. HOLBROOK 2,958,337
FLUID PRESSURE REGULATING VALVE DEVICE FOR
SUPPLYING GRADUATED DELIVERY PRESSURE
ACCORDING TO THE SUPPLY PRESSURE
Filed Dec. 28, 1956 2 Sheets-Sheet 1

INVENTOR.
Edward L. Holbrook
BY
Adelbert A. Steinmeier
ATTORNEY

Nov. 1, 1960 E. L. HOLBROOK 2,958,337
FLUID PRESSURE REGULATING VALVE DEVICE FOR
SUPPLYING GRADUATED DELIVERY PRESSURE
ACCORDING TO THE SUPPLY PRESSURE
Filed Dec. 28, 1956 2 Sheets-Sheet 2

INVENTOR.
Edward L. Holbrook
BY
Adelbert A. Steinmiller
Attorney

United States Patent Office 2,958,337
Patented Nov. 1, 1960

2,958,337
FLUID PRESSURE REGULATING VALVE DEVICE FOR SUPPLYING GRADUATED DELIVERY PRESSURE ACCORDING TO THE SUPPLY PRESSURE

Edward L. Holbrook, East McKeesport, Pa., assignor to Westinghouse Air Brake Company, Wilmerding, Pa., a corporation of Pennsylvania Filed Dec. 28, 1956, Ser. No. 631,304

6 Claims. (Cl. 137—620)

This invention relates to fluid pressure regulating valve devices and more particularly to fluid pressure regulating valve devices of the self-lapping type.

The usual pressure regulating valve devices of the self-lapping type comprise an operator's stem means actuable by selected degrees of depression inwardly of a casing, up to a maximum extent, for effecting corresponding degrees of separation between a supply valve and its seat to permit fluid under pressure to be supplied to a delivery port from a source of supply fluid at a certain supply pressure, and a movable abutment operable by delivery pressure to effect reseating of the supply valve while compressing a metal helical control spring. The degree of separation between the supply valve and its seat determines the degree of compression of the control spring necessary for reseating of the supply valve, hence the pick-up value of such control spring, for a movable abutment of a particular size, determines the degree of delivery pressure realized as a result of any given degree of such separation between supply valve and seat, up to the maximum delivery pressure limited by either the value of the supply pressure or the limit of travel of the stem means of such device. In order that the maximum delivery pressure available from such a regulating valve device be made compatible both with the maximum limit of travel of the operator's stem means and with a particular supply pressure, it is common practice to substitute control springs of different pick-up values according to the supply pressure with which the regulating valve device is to be employed in a given control installation.

In view of the foregoing remarks, it is a prime object of the present invention to provide a pressure regulating valve device of the self-lapping type which does not require use of control springs of different pick-up value to condition it for use with different supply pressures.

It is a further object of the present invention to provide a pressure regulating valve device of the self-lapping type which is automatically adjustable according to the supply pressure with which it is employed, to provide a full range of delivery pressures up to a maximum value compatible with full travel of the operator's stem means and with any particular supply pressure.

Figure 2:
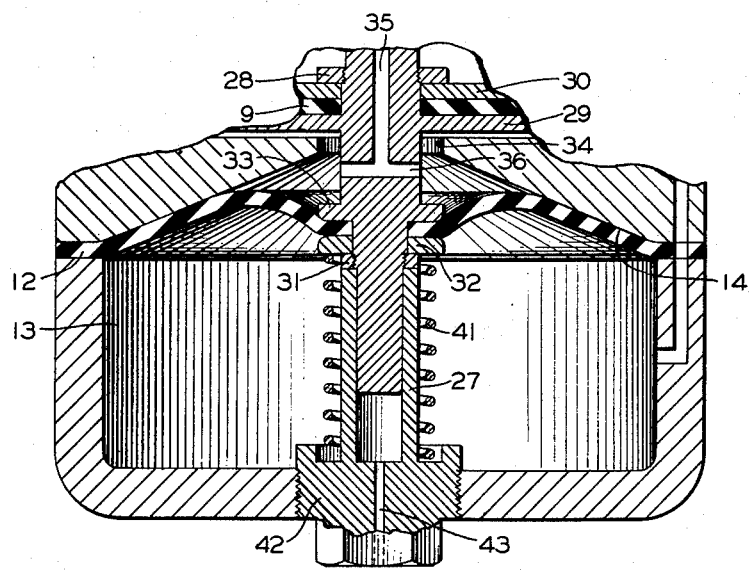

Other objects and advantages of the invention will become apparent from the following detailed description of the invention when taken in connection with the accompanying drawings in which Fig. 1 is an elevational view, partly in outline and partly in section, of a pressure regulating valve device embodying the invention, and Fig. 2 is a fragmentary view showing certain parts of the valve device in positions different than shown in Fig. 1.

Description

Referring to Fig. 1 of the drawings, the pressure regulating valve device embodying the invention essentially comprises a divided casing 1 containing supply and release valves 2 and 3 which are cooperable with supply and release valve seat elements 4 and 5, respectively, to control fluid pressure communication selectively between a delivery port 6 and either a supply port 7 or a vent port 8, a movable abutment in the form of a flexible annular diaphragm 9, subject opposingly to pressure of fluid in a delivery pressure chamber 10 and a non-pressure chamber 11, to provide a self-lapping feature of the control valve device, and a second movable abutment in the form of a flexible shallow dish-shaped diaphragm 12 subject on its one face to pressure of fluid in a supply pressure chamber 13 and cooperable with a conical surface 14, to function as a control spring which is automatically adjusted according to the particular supply pressure with which the valve device may be employed.

More particularly, for sake of illustration the supply valve 2 may be of spherical shape as shown 'n the drawing substantially disposed in a cylindrical cavity 15 formed in the supply valve seat element 4. A light bias spring 16, disposed coaxially in the cavity 15, is arranged to urge the supply valve 2 in the direction of a complementary annular seat 17 formed in the seat element 4 to close off the cavity 15 from a port 18 encircled at one end by the seat 17 and extending through an end of said seat element.

The outer peripheral surface of the supply valve seat element 4 is cylindrical and is in slidably guided cooperation with a bore 19 opening inwardly of the casing 1 from its exterior surface. The end of the seat element 4, opposite to the end in which the port 18 is located, extends through the bore 19 to the exterior of the casing 1 to act as an operator's stem portion which enables such seat element to be actuated inwardly of the bore 19 through the medium of a cam, for example, which is not shown in the drawing. The cavity 15 in seat element 4 is in constantly open communication with the supply port 7 via a plurality of radial ports 20 in the seat element 4, and an annular recess 21 formed in the casing 1 in encirclement of such seat element.

The release valve 3 is of shape similar to that of the supply valve 2 and is disposed in a hollow cylindrical cavity 22 formed in an end of the release valve seat element 5 an outer periphery of which is in slidable guided sealed cooperation with the wall of the bore 19. The release valve 3 is removably attached to the supply valve 2 via a rigid stem 23 which extends therebetween and which may have screw threaded connection to valve 3 for convenience of assembly. A light bias spring 24 is interposed between the seat elements 4 and 5 in encirclement of the stem 23 to urge the supply valve seat element 4 toward a repose position in which it is shown in the drawing as defined by engagement of an annular shoulder 25 with an annular stop element 26 removably secured to the casing 1. Intermediate the supply and release valve seat elements 4 and 5, the bore 19 is constantly open to the delivery port 6 which opens through the wall thereof.

The release valve seat element 5 is of cylindrical shape and extends at one end from the bore 19 through chambers 10 and 11 into slidably guided sealed cooperation with the interior wall of a removable hollow-cylindrical guide element 27 projecting into the chamber 13. The release valve seat element 5 is clamped to a central portion of the annular diaphragm 9 by a nut 28 via an integrally formed annular diaphragm follower member 29 disposed in chamber 11 and a removable follower member 30 disposed in chamber 10, and is clamped also to a central portion of the diaphragm 12 by a nut 31 via a removable annular diaphragm follower member 32 disposed in chamber 13 and an opposite annular follower member 33 formed integrally with said seat element, which latter follower member is accommodated, in a repose position in which it is shown in the drawing, by a casing port 34 opening centrally into the chamber 11. Formed interiorly of the release valve seat element 5 there is a central passage 35 which is encircled at one end by an annular valve seat for release valve 3 similar to valve seat 17 for supply valve 2, and is constantly open to the chamber 11 at its opposite end via ports 36.

The delivery port 6 is adapted, by such screw threads 37 formed in the casing 1, for connection to a fluid pressure device to be controlled or actuated pneumatically, for example, via a threaded pipe (not shown).

The supply port 7 is similarly adapted by casing threads 38 for connection via such as a pipe (not shown) to a source (not shown) of fluid under pressure such as a compressor-supplied reservoir storing fluid at a substantially constant pressure.

In accord with a novel feature of the invention, the supply port 7 is constantly connected to the chamber 13 by a passage 39.

The vent port 8 constantly opens the non-pressure chamber 11 to the atmosphere.

The diaphragm 9 is clamped at its outer periphery by means (not shown) between portions of the casing 1 to form a fluid tight seal therebetween.

The delivery pressure chamber 10 is constantly open to the delivery port 6 by way of a stabilizing port 40 formed in the casing 1.

The flexible diaphragm 12 is clamped at its outer periphery between portions of the divided casing 1 and is disposed for contact with the conical surface 14 formed in such casing. A spring 41 is arranged to urge, by engagement at its one end with follower member 32, the diaphragm 12 toward its repose position in which it is shown in the drawing in substantially overall contact with surface 14, primarily for the purpose of preventing looseness and rattling of element 5 during shipping when chamber 13 is devoid of fluid under pressure. A removable element 42 in screw-threaded attachment with a portion of the divided casing 1 serves as a seat for one end of the spring 41 to enable its removal from chamber 13 without separation of the casing sections. The hollow cylindrical guide element 27 is integrally attached to the removable element 42, and the interior of guide element 27 at the respective end of seal element 5 is vented to the atmosphere via a vent port 43.

*Operation*

In operation of the pressure regulating valve device embodying the invention, assume that all components of such device are in the respective positions in which they are shown in the drawing, and that the supply port 7 is connected to a source of supply fluid at a particular pressure, and therefore the chamber 13 connected to said supply port by the passage 39 and annular recess 21 is charged with fluid at supply pressure. Further assume that the delivery port 6, hence delivery pressure chamber 10 connected thereto by the stabilizing port 40, are devoid of fluid under pressure and that it is desired to effect pressurization of same.

An operator will effect depression of the outer end of the supply valve seat element 4 into the bore 19 in the casing 1, thereby causing the supply valve seat 17 formed in said element 4 to move in the direction of exhaust valve seat element 5 while the supply valve 2 at this time remains stationary.

Upon separation of supply valve seat 17 from the supply valve 2, fluid under pressure will flow from a source thereof via the supply port 7, the annular recess 21, the ports 20, the port 18, the bore 19, to delivery port 6 whence such fluid under pressure will flow to a device (not shown) to be actuated and to the delivery chamber 10 by way of the stabilizing port 40.

By virtue of such flow of fluid under pressure from the supply port 7 to the delivery port 6 and delivery chamber 10, the pressure of fluid in such delivery pressure chamber will thus be caused to increase.

When the delivery pressure experienced in chamber 10 in acting on the diaphragm 9 increases sufficiently to create a downward force on release valve seat element 5 sufficiently to overcome the initial bias of the relatively light spring 41 and of the supply pressure in chamber 13 acting on the annular area of diaphragm follower member 32, such release valve seat element 5 will be caused to move in the direction of chamber 13 as the diaphragm follower member 33 is caused to leave the port 34 and the inner peripheral portion of the diaphragm 12 is peeled away from the conical surface 14. Fig. 2 illustrates the position of diaphragm 12 in its peeled position should the release valve seat element 5 be moved downwardly to its limit defined by engagement of the follower member 32 with the guide element 27 in chamber 13. The maximum effective diameter of diaphragm 12, therefore, is the shortest diametral distance between two points of contact of said diaphragm with the conical surface 14.

During such movement of the release valve seat element 5, the bias spring 16 acting on supply valve 2 will cause same to follow such movement through the medium of the rigid stem 23 and the release valve 3 thereby held in seated engagement with such release valve seat element.

At the same time, the peeling away of the inner periphery of the diaphragm 12 away from the conical surface 14 will progressively increase the area of such diaphragm effective to oppose downward movement of release valve seat element 5, with the result that the supply pressure in chamber 13 in acting on the progressively increasing effective area of diaphragm 12 unsupported by such conical surface 14 will create a progressively increasing force opposing downward movement of the stem 5, an action simulating the increased opposition which would be afforded by compression of a mechanical control spring.

When the downward movement of the release valve seat element 5 under influence of increase in delivery pressure in chamber 10 in opposition to supply pressure in chamber 13 acting on the variable effective area diaphragm 12 moves the seat element 5 sufficiently to cause return of the supply valve 2 into contact with its seat 17, supply of fluid under pressure from port 7 to delivery port 6 via port 18 in seat element 4 will be terminated and the delivery pressure in port 6 and in chamber 10 then will be commensurate with the degree of initial depression of the supply valve seat element 4, and the valve of such delivery pressure will be dependent upon supply pressure in chamber 13 acting on the unsupported area of the variable effective area diaphragm 12 in opposition to delivery pressure in chamber 10 acting on the diaphragm 9. With downward movement of the release valve seat element 5 and seating of supply valve 2, as just described, release valve 3, by virtue of its connection to said supply valve 2 through stem 23, will also be biased by spring 16 to maintain said release valve 3 in its seated position on the release valve seat element 5, as hereinbefore described.

From the foregoing it will be apparent that by further depression of the supply valve seat element 4 inwardly of the bore 19 up to a maximum value equivalent to that necessary to cause the maximum area of the diaphragm 12 to leave the conical surface 14, delivery pressure may be increased up to a maximum pressure corresponding to deflection of the diaphragm 12 away from the surface 14.

It should be pointed out that, in any particular case, as the diaphragm 12 leaves the surface 14, the clearance space between the separated portion of the diaphragm and such surface will be at atmospheric pressure by virtue of communication with the non-pressure chamber 11 by the casing port 34.

In accord with an object of the invention, it will also be apparent that by virtue of the chamber 13 being at supply pressure, that the bias imposed by action of such pressure on the diaphragm 12 will vary according to the degree of such supply pressure, to automatically provide a bias for the valve device which is commensurate with any particular supply pressure.

In the representation of the novel pressure regulating valve device as shown in the drawing, the maximum effective area of the diaphragm 12 being substantially equal to that of the diaphragm 9, it will be apparent from the foregoing description that the maximum delivery pressure which may be obtained will substantially equal the particular supply pressure with which the device is employed. Where it is desirable that the maximum delivery pressure be kept somewhat less than the supply pressure, the effective area of the diaphragm 9 may be made somewhat greater than the maximum available effective area of the diaphragm 12.

While the supply valve seat element 4 is being held in any selected position of depression calling for a certain delivery pressure, should the delivery pressure tend to decrease below that called for by virtue of such position, as due for example to leakage of fluid under pressure from the pipe to which the delivery port 6 may be connected, such reduction in delivery pressure as experienced in the delivery pressure chamber 10 will permit the supply pressure in chamber 13 acting on the effective area of the variable area diaphragm 12 to move the release valve seat element 5 upwardly, as viewed in the drawing, and through the medium of the release valve 3 and stem 23 cause the supply valve 2 to leave its seat 17 and permit fluid under pressure from the supply pipe 7 to flow to the delivery port 6 as previously described to reestablish the desired delivery pressure which, when attained in chamber 10, will effect return movement of the release valve seat element 5 downwardly as viewed in the drawing, thereby enabling the bias spring 16 to reseat the supply valve 2 in behalf of holding such desired delivery pressure.

When it is desired to reduce the delivery pressure, depressing force exerted on the supply valve seat element 4 will be relaxed to an extent necessary to permit the spring 24 to move such element 4 outwardly of the bore 19 a distance or distances in accord with the degree of reduction in delivery pressure desired.

Such outward movement of the supply valve seat element 4, by virtue of supply valve 2 being carried therewith by contact with its seat 17, and through the medium of stem 23 will cause the release valve 3 to be moved away from its seat in element 5.

Upon unseating of the release valve 3 from element 5, fluid under pressure will flow from the device to be controlled (not shown), by way of the delivery port 6, the bore 19, central passage 35 and ports 36 in seat element 5, the chamber 11, and the vent port 8 to the atmosphere, thereby reducing the pressure of fluid experienced in said delivery port as well as in the delivery pressure chamber 10 in communication therewith via stabilizing port 40.

During such reduction in delivery pressure as experienced in the delivery pressure chamber 10, the supply pressure as experienced in chamber 13 in acting on the variable effective area diaphragm 12 will cause the release valve seat element 5 to move upwardly as viewed in the drawing while such diaphragm 12 is brought into increased contact with the tapered annular surface 14. Such release of fluid under pressure from the delivery port 6, hence reduction in delivery pressure, will continue until the resultant upward movement of the release valve seat element 5 brings same into seating engagement with the repositioned release valve 3 to thereby terminate further withdrawal of fluid under pressure from such delivery port.

At this time the pressure forces acting on diaphragms 9 and 12 as transmitted to the release valve seat element 5 will be in equilibrium so long as the supply valve seat element 4 remains in its newly placed position.

It will be apparent that upon permitting the spring 24 to return the supply valve seat element 4 to the position in which it is shown in the drawing defined by engagement of the annular shoulder 25 with the stop element 26, the release valve 3 will be carried away from the seat element 5 sufficiently to permit the delivery pressure to reduce to that of the atmosphere before the seat element 5 is returned into engagement with the release valve 3 under influence of supply pressure in chamber 13 acting on the variable area diaphragm 12 which will return to its repose position in which it is shown in the drawing in complete contact with the conical surface 14.

*Summary*

In supplement to the foregoing description it should be pointed out that by provision of a diaphragm arrangement of variable effective area in subjection to supply pressure, the pressure regulating valve device disclosed herein is rendered capable of establishing delivery pressures as proportions of a constant supply pressure according to correspondingly proportionate movement of an operator's stem, irrespective of the particular value of such supply pressure.

In explanation, it will be understood by previous description and reference to the showing in the drawing, that, regardless of the particular value of the supply pressure as experienced in chamber 13 of the novel pressure regulating valve device, a given degree of depression of the operator stem portion of seat element 4 inwardly of the bore 19, in causing a corresponding degree of separation between the supply valve 2 and its seat in element 4, must be followed by an equal degree of downward travel of the seat element 5 in order to effect return of the supply valve 2 to its seat. Since the degree of effective area of the diaphragm 12, i.e. the area thereof which is moved away from the conical surface 14, acted on by supply pressure in chamber 13 is dependent only upon the degree of such downward travel of seat element 5, it follows that the degree of delivery pressure which must be built up in chamber 10 in order to effect such movement of seat element 5 for closure of supply valve 2 will be proportionate to the degree of element 5 movement, hence will be proportionate to degree of depression of element 4. Still further, since, for any given supply pressure in chamber 13, the degree of influence of such supply pressure on seat element 5 is proportionate to the effective area of the diaphragm 12, it follows that degree of delivery pressure established in chamber 10 prior to closure of the supply valve 2 will also be proportionate to the degree of supply pressure.

Having now described the invention, what I claim as new and desire to secure by Letters Patent, is:

1. A fluid pressure regulating valve device comprising a casing having a fluid pressure supply port to which fluid at various selected supply pressures may be supplied, and a delivery port through which fluid under pressure is delivered to a receiving device connected thereto, self-lapping valve means having an operating member displaceable from a normal position to cause fluid under pressure to be supplied from said supply port to said delivery port to establish a pressure in the receiving device corresponding to the amount of displacement of said operating member, and a variable effective area diaphragm subject on one side to the pressure of fluid supplied to said supply port, for controlling operation of said self-lapping valve means, so as to vary the pressure delivered thereby for a given displacement of said operating member out of its normal position according to the pressure of fluid supplied to said supply port.

2. A fluid pressure regulating valve device comprising a casing having a fluid pressure supply port to which fluid at various selected supply pressures may be supplied, and a delivery port through which fluid under pressure is delivered to a receiving device connected thereto, self-lapping valve means having an operating member displaceable from a normal position to cause fluid under pressure to be supplied from said supply port to said delivery port, and a diaphragm subject to fluid at supply pressure and having a variable effective area controlled according to displacement of said operating member for controlling operation of said self-lapping valve means so as to cause the self-lapping valve means to vary the pressure of fluid delivered by said self-lapping valve means thereby both according to such displacement and to the degree of such supply pressure.

3. A fluid pressure regulating valve device comprising casing means having a supply port for connection to a source of fluid under pressure, and a delivery port for connection to fluid pressure means to be pressure controlled or actuated; communication control means operable to establish a supply communication from said supply port to said delivery port; first movable abutment means operatively connected to said communication control means for effecting operation thereof to cause disestablishment of said supply communication responsively to pressure of fluid obtaining in said delivery port; and second movable abutment means subject to pressure of fluid obtaining in said supply port to oppose operation of said first movable abutment means for determining the degree of delivery pressure necessary to cause the disestablishment of the supply communication.

4. A fluid pressure regulating valve device comprising casing means having a supply port for connection to a source of fluid under pressure, and a delivery port for connection to fluid pressure means to be pressure controlled or actuated; communication control means including a supply valve and seat therefor separable one from the other selected degrees for establishing a fluid pressure supply communication from said supply port to said delivery port; a first movable abutment subject to pressure of fluid obtaining in said delivery port and operatively connected to said communication control means to effect seating of said supply valve on its seat for disestablishing said supply communication; and a second movable abutment subject to pressure of fluid obtaining in said supply port and connected to said first movable abutment for opposition to action of delivery pressure thereon, said second movable abutment also being cooperable with said casing means to vary the degree of said opposition according to the degree of separation between said supply valve and its seat.

5. A fluid pressure regulating valve device comprising casing means having a supply port for connection to a source of fluid under pressure, a delivery port for connection to fluid pressure means to be pressure controlled or actuated, and a vent port open to the atmosphere; first spring means; a supply valve seat actuable to selected positions against opposition of said first spring means; a supply valve cooperable with said supply valve seat to control fluid pressure communication from said supply port to said delivery port; second spring means biasing said supply valve toward said supply valve seat; a movable release valve seat including a rod extending coaxially therefrom; a release valve rigidly connected to said supply valve and cooperable with said release valve seat to control fluid pressure communication from said delivery port to said vent port; first diaphragm means operatively connected to said release valve seat and subject to pressure of fluid obtaining in said delivery port for moving said release valve seat to permit said second spring means to seat said supply valve; and second diaphragm means connected to said release valve seat by said rod and cooperable on its one face with said casing means for contact therewith to provide an effective area varying directly with the degree of supply-valve-seating movement of said release valve seat, and being subject on its opposite face to pressure of fluid obtaining in said supply port to oppose such movement of said release valve seat.

6. A fluid pressure regulating valve device as set forth in claim 5, further comprising a third spring means biasing said release valve seat and said second diaphragm toward a repose position defined by substantially complete engagement of said one face of said second diaphragm with said casing means.

References Cited in the file of this patent

UNITED STATES PATENTS

| | | |
|---|---|---|
| 2,185,449 | Veenschoten | Jan. 2, 1940 |
| 2,602,429 | Worster | July 8, 1952 |
| 2,667,860 | Henderson | Feb. 2, 1954 |
| 2,811,134 | Clements | Oct. 29, 1957 |
| 2,825,361 | Seljos | Mar. 4, 1958 |